(12) United States Patent
Yang

(10) Patent No.: US 12,366,468 B2
(45) Date of Patent: Jul. 22, 2025

(54) SENSOR PROTECTION SYSTEM

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 156 days.

(21) Appl. No.: 18/107,919

(22) Filed: Feb. 9, 2023

(65) Prior Publication Data
US 2024/0110817 A1    Apr. 4, 2024

(30) Foreign Application Priority Data

Sep. 30, 2022  (KR) .................. 10-2022-0124919

(51) Int. Cl.
*G01D 11/24*  (2006.01)

(52) U.S. Cl.
CPC .................. *G01D 11/245* (2013.01)

(58) Field of Classification Search
CPC ................................. G01D 11/245
See application file for complete search history.

(56) References Cited

U.S. PATENT DOCUMENTS

| | | | |
|---|---|---|---|
| 10,761,190 B1 * | 9/2020 | Sykula | G01S 17/931 |
| 11,237,028 B1 * | 2/2022 | Surineedi | G01S 7/027 |
| 11,273,798 B2 | 3/2022 | Giraud | |
| 11,480,451 B2 * | 10/2022 | Ellgas | G01D 11/245 |
| 2012/0162428 A1 * | 6/2012 | Wee | B60S 1/56 348/148 |
| 2019/0106086 A1 | 4/2019 | Giraud | |
| 2019/0310470 A1 * | 10/2019 | Weindorf | B60S 1/56 |
| 2022/0268892 A1 * | 8/2022 | Phinisee | G01S 7/4813 |
| 2023/0219582 A1 * | 7/2023 | Diehl | G01S 17/931 701/1 |

FOREIGN PATENT DOCUMENTS

JP    H0772541 A  * 9/1993
KR    20180136981 A    12/2018

* cited by examiner

*Primary Examiner* — Jamel E Williams
(74) *Attorney, Agent, or Firm* — Lempia Summerfield Katz LLC

(57) ABSTRACT

A sensor protection system includes an environmental sensor with a sensing portion and a hood provided on the environmental sensor. The hood includes a passage configured to direct or adjust an airflow incident on a sensing portion of the environmental sensor.

11 Claims, 5 Drawing Sheets

SENSOR PROTECTION SYSTEM

CROSS-REFERENCE TO RELATED APPLICATION

This application claims, under 35 U.S.C. § 119(a), the benefit of and priority to Korean Patent Application No. 10-2022-0124919, filed on Sep. 30, 2022, the entire contents of which are incorporated herein by reference.

BACKGROUND

(a) Technical Field

The present disclosure relates to a sensor protection system and, more particularly, to a protection system of an environmental sensor mounted on a vehicle.

(b) Background Art

Recently, vehicles have been equipped with driver assistance systems that assist a driver of a vehicle in order to secure or ensure safe traveling or operation of a vehicle in various traveling situations. In addition to the driver assistance systems, research and development of self-driving vehicles capable of driving without driver intervention are being actively conducted.

For such a driver assistance system, various types of environmental sensors capable of sensing a surrounding environment in various ways are mounted in or on a self-driving vehicle. Environmental sensors installed in or on a vehicle may be a radar, a LiDAR, a camera, and the like.

Because these sensors are mounted on the outside of the vehicle, the sensing regions or sensing surfaces thereof may become dirty or contaminated due to or by foreign substances, such as dust, rain, snow, or the like. Therefore, in order to maintain the performance of the sensors, these sensors must be kept at or above a predetermined level of cleanliness. For this reason, a contamination detection device configured to detect contamination of the sensors and a sensor cleaning system capable of cleaning the sensors when the sensing region is contaminated based on the detection by the contamination device are provided in the vehicle.

The above information disclosed in this Background section is provided only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. It is an object of the present disclosure to provide a sensor protection system capable of keeping an environmental sensor clean while minimizing the frequency and/or duration of operation of a sensor cleaning system of a vehicle.

The objects of the present disclosure are not limited to the above-mentioned objects. Other objects not mentioned should be clearly understood by those of ordinary skill in the art to which the present disclosure pertains based on the description below.

In one aspect, the present disclosure provides a sensor protection system including a hood provided on an environmental sensor. The hood includes a passage configured to adjust airflow that is incident on a sensing portion of the environmental sensor.

Other aspects and embodiments of the disclosure are discussed below.

It should be understood that the terms "vehicle" or "vehicular" or other similar terms as used herein are inclusive of motor vehicles in general. Such motor vehicles encompass passenger automobiles including sport utility vehicles (SUV), buses, trucks, various commercial vehicles, watercraft including a variety of boats and ships, aircraft, and the like. Additionally, such terms include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed below.

BRIEF DESCRIPTION OF THE DRAWINGS

The above and other features of the present disclosure are described in detail with reference to certain embodiments thereof illustrated in the accompanying drawings, which are provided hereinbelow by way of example only, and thus do not limit the present disclosure, and wherein.

Figure 1:
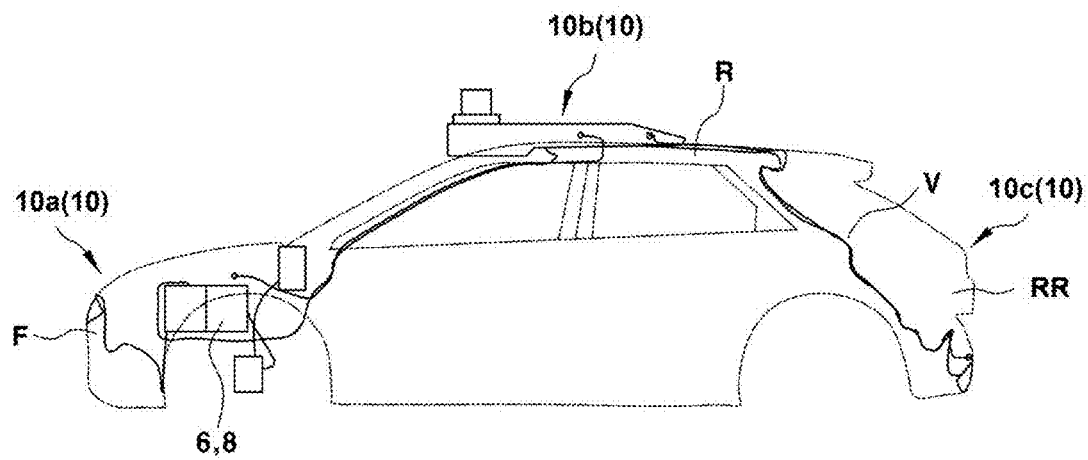
FIG. 1 illustrates a layout of a sensor cleaning system and environmental sensors on a vehicle.

It should be understood that the appended drawings are not necessarily to scale, presenting a somewhat simplified representation of various features illustrative of the basic principles of the inventive concepts. The specific design features of the present inventive concept as disclosed herein, including, for example, specific dimensions, orientations, locations, and shapes, will be determined in part by the particular intended application and use environment.

In the figures, the reference numbers refer to the same or equivalent parts of the present disclosure throughout the several figures of the drawings.

DETAILED DESCRIPTION

Descriptions of specific structures or functions presented in the embodiments of the present disclosure are merely provided by way of example for the purpose of explaining the embodiments according to the present inventive concept. The embodiments according to the concepts of the present disclosure may be implemented in various forms. In addition, the descriptions should not be construed as being limited to the embodiments described herein, and should be understood to include all modifications, equivalents, and substitutes falling within the idea and scope of the present inventive concept.

Meanwhile, in the present disclosure, terms such as "first" and/or "second" may be used to describe various components, but the components are not limited by these terms. These terms are only used to distinguish one component from another. For example, a first component could be termed a second component, and similarly, a second component could be termed a first component, without departing from the scope of the embodiments of the present disclosure.

It should be understood that when a component is referred to as being "connected to" another component, the component may be directly connected to the other component, or intervening components may also be present. In contrast, when a component is referred to as being "directly connected to" another component, there are no intervening components present. Other terms used to describe relationships between components should be interpreted in a similar fashion (e.g., "between" versus "directly between," "adjacent" versus "directly adjacent," etc.).

Throughout the specification, like reference numerals indicate like components. The terminology used herein is for the purpose of describing embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements. The same applies to similar terms such as "having," "including," and the like, and variations thereof. When a component, device, element, or the like of the present disclosure is described as having a purpose or performing an operation, function, or the like, the component, device, or element should be considered herein as being "configured to" meet that purpose or perform that operation or function.

Hereinafter, the present inventive concept is described in detail with reference to the accompanying drawings.

As described above, various types of environmental sensors configured to detect the surrounding environment are mounted on self-driving vehicles, vehicles equipped with a driver assistance system, and the like. As a non-limiting example, an environmental sensor may include a lidar, a radar, a camera, and the like.

As illustrated in FIG. 1, environmental sensors 10a, 10b, 10c: collectively, 10 may be mounted on a front portion F, a rear portion RR, a side portion, a roof R, or the like, of a vehicle V.

Because a vehicle is mostly outdoor and in motion (e.g., during traveling, operation of the vehicle), the environmental sensors 10 mounted on the outside of the vehicle may be contaminated not only by rain, but also by foreign substances, such as dust and insects. For this reason, a sensor cleaning system is provided in the vehicle to clean the contaminated environmental sensors 10. Cleaning of the environmental sensors may be performed using a washer fluid or high-pressure compressed air.

Figure 2:
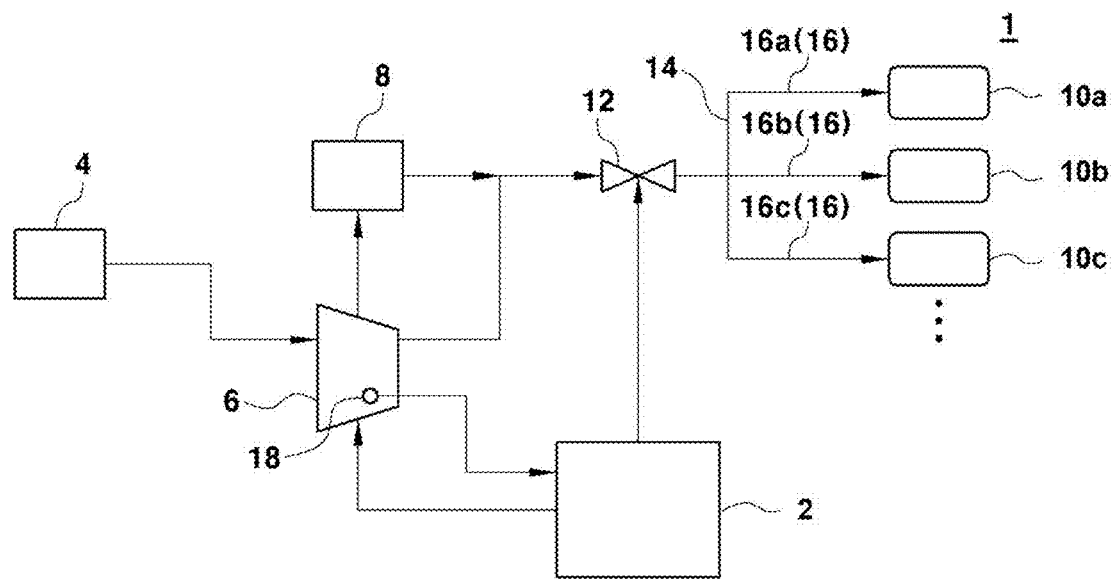
FIG. 2 illustrates a layout of an air cleaning system of a vehicle.

As an example, with reference to FIG. 2, an air cleaning system 1 including a compressor 6 and an air tank 8 is configured to perform cleaning by spraying compressed air onto the environmental sensor 10.

Figure 3:
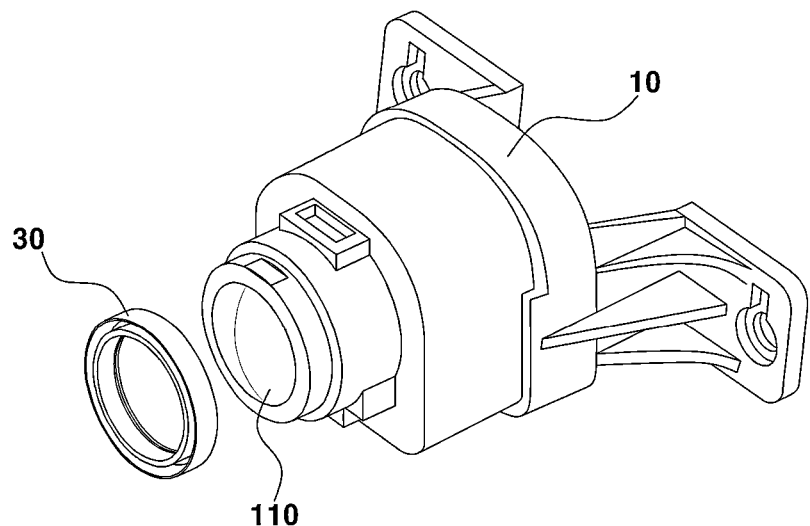
FIG. 3 is an exploded perspective view of a sensor protection system and an environmental sensor according to an embodiment of the present disclosure.

Specifically, air filtered through an air filter 4 provided in the vehicle is introduced into the compressor 6. The air is compressed in the compressor 6 and then discharged to or onto the surface of the environmental sensor 10, thereby removing foreign substances on the environmental sensor 10. Although FIG. 3 shows three environmental sensors 10a, 10b, 10c, the number of environmental sensors is not limited thereto and may be increased or decreased.

In addition, the air cleaning system 1 includes the air tank 8. The air compressed by the compressor 6 or air supplied by an external device may be stored in the air tank 8 and used for cleaning of the environmental sensors 10.

The air cleaning system 1 includes a controller 2 configured to operate a valve 12, e.g., a solenoid valve, in a predetermined situation, such as at or during each occurrence of a preset period of time or when the environmental sensor 10 detects contamination. Accordingly, the compressed air is discharged from the compressor 6 or from the air tank 8 to each of the environmental sensors 10, which cleans the environmental sensors 10. Specifically, the valve 12 is provided with a distributor 14 so as to distribute the compressed air through nozzles 16a, 16b, 16c: collectively, 16 arranged for each of the environmental sensors 10.

The controller 2 may also control the operation of the compressor 6. The controller 2 may control the operation of the compressor 6 so that the compressor 6 operates within an operating limit temperature range. To this end, the compressor 6 is provided with a temperature sensing portion 18. The temperature of the compressor 6 sensed by the temperature sensing portion 18 is transmitted to the controller 2 of the air cleaning system 1. The controller 2 may control the operation of the compressor 6 based on the temperature sensed by the temperature sensing portion 18. The controller 2 can be a separate controller provided as part of one of the sensors or as part of a sensor system or can be a vehicle controller that also controls other aspects of the vehicle. The controller can be a conventional computer and/or include a microprocessor and a memory, as is known in the art.

As such, a sensor cleaning system is essential in a self-driving vehicle, a vehicle with a driver-assist system, etc. However, frequent operation of the sensor cleaning system may increase power consumption, cause a large load on components, such as a compressor, and weaken the durability of the entire system.

For this reason, the present disclosure proposes a sensor protection system capable of keeping an environmental sensor clean while minimizing the frequency of operation of a sensor cleaning system. Particularly, the present disclosure may provide the above-described effects by preventing contamination of the surface of the environmental sensor using the travel wind, driving wind, or air on or contacting a vehicle as the vehicle moves or is driven. The travel wind or air may be incident or impinge on a surface of the vehicle, for example, a surface of the environmental sensor, while the vehicle is traveling.

Figure 4:
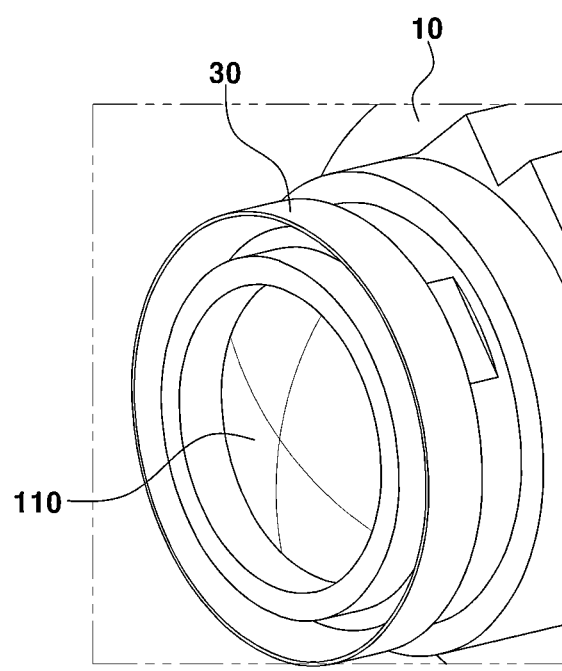
FIG. 4 illustrates a state in which a sensor protection system according to an embodiment of the present disclosure is mounted on an environmental sensor.

As illustrated in FIGS. 3 and 4, the sensor protection system according to an embodiment of the present disclosure includes a hood 30 mounted on the environmental sensor 10. Specifically, the hood 30 may be mounted on the circumference of a sensing portion 110 of the environmental sensor 10. According to an embodiment of the present disclosure, the hood 30 may be screwed on to the environmental sensor 10. To this end, a first thread may be formed on the inner circumferential surface of the hood 30, and a second thread to be coupled to the first thread in the hood 30 may be formed on the environmental sensor 10 where the hood 30 is mounted. According to another embodiment of the present disclosure, the hood 30 may be fitted to the environmental sensor 10. The hood 30 and the environmental sensor 10 may have a fitting structure that may be engaged with each other, respectively. For example, a fitting structure may include being press fit or may include one or more protrusions configured to be received in one or more recesses, securing a position of the hood 30 relative to the environmental sensor.

The hood 30 has a passage 50. The passage 50 may direct a flow of the wind or air blowing toward the sensing portion 110, for example, the travel wind on the vehicle V. The passage 50 may also increase the flow rate of the travel wind reaching the sensing portion 110. The passage 50 may discharge the travel wind at a high speed onto the sensing portion 110 so as to form an air curtain on or adjacent to the sensing portion 110. The air curtain may function as a barrier against foreign substances, preventing foreign substances from contacting the sensing portion 110.

Figure 5:
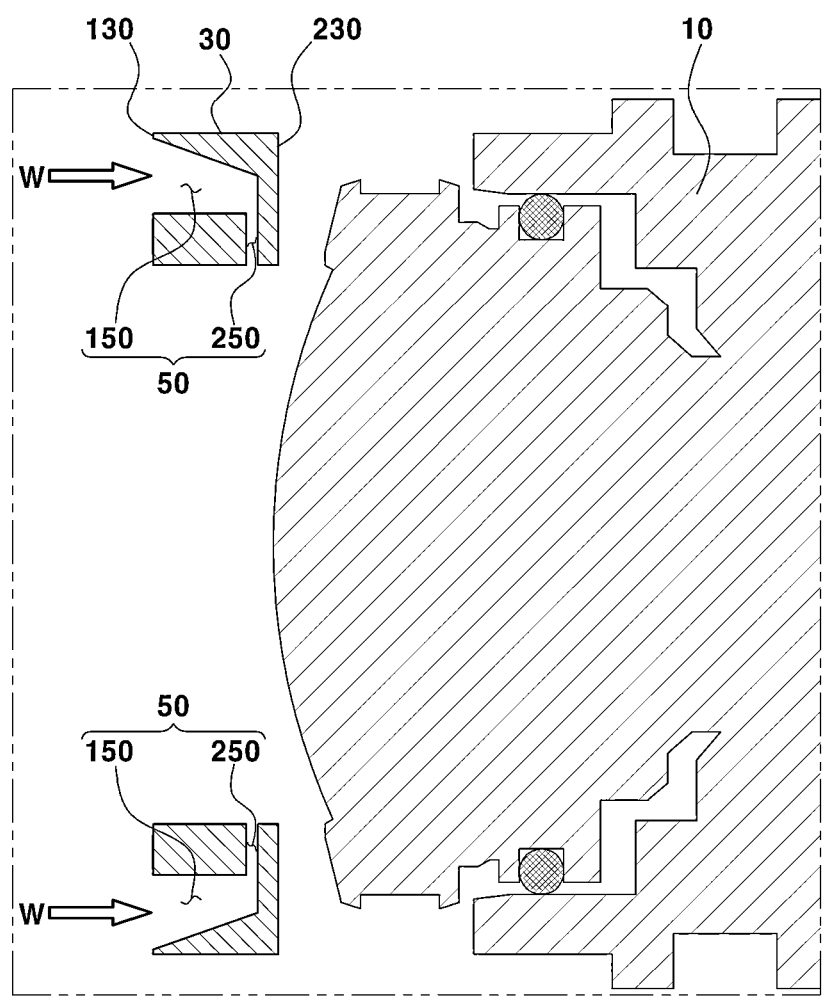
FIG. 5 is a cross-sectional view of the sensor and protection system of FIG. 4.

As illustrated in FIG. 5, the passage 50 includes an entry passage 150 through which a travel wind W enters. The passage 50 also includes an exit passage 250 through which the travel wind W passing through the entry passage 150 exits towards the sensing portion 110.

The entry passage 150 may be formed substantially parallel to the axial direction of the hood 30. For example, the entry passage 150 may have a circular or ring shape. The entry passage 150 may increase the flow rate of the travel wind reaching the circumference of the sensing portion 110 while guiding the travel wind W in the axial direction of the hood 30. To this end, in one embodiment, the entry passage 150 is tapered from a distal end 130 of the hood 30 towards a proximal end 230 of the hood 30. The speed of the travel wind W flowing through the entry passage 150 increases as a cross-sectional area of the entry passage 150 decreases. Here, the distal end 130 of the hood 30 is an end of the hood 30 that is located away from the environmental sensor 10 and refers to an end of the hood 30 located upstream with respect to the flow of the travel wind W. The proximal end 230 of the hood is an end of the hood 30 located closer to the environmental sensor 10 than the distal end 130 and refers to an end of the hood 30 located downstream with respect to the flow of the travel wind W.

The travel wind W passing through the entry passage 150 is guided to the exit passage 250 extending from the entry passage 150. The travel wind W passing through the exit passage 250 is discharged toward or onto the sensing portion 110.

The exit passage 250 may extend in a direction from the entry passage 150 towards the sensing portion 110. Specifically, the exit passage 250 may be formed in the radial direction of the environmental sensor 10. The exit passage 250 may be formed and extend in a direction substantially perpendicular to the entry passage 150. Moreover, the exit passage 250 has a cross-sectional area smaller than the cross-sectional area of the entry passage 150 to further increase the speed of the travel wind W before the travel wind W is directed onto the sensing portion 110.

Figure 6:
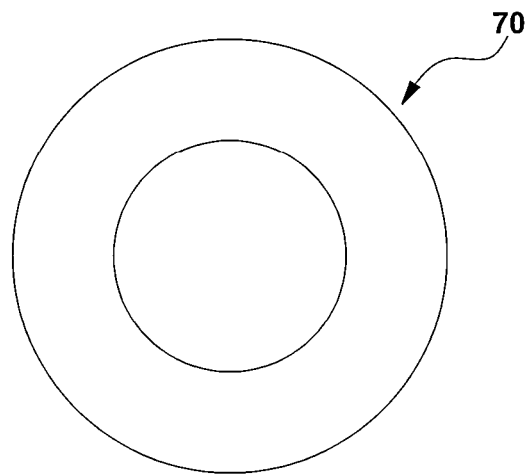
FIG. 6 illustrates a shape of a filter of a sensor protection system according to an embodiment of the present disclosure.

According to the present disclosure, the sensor protection system may further include a filter 70. The filter 70 may be disposed in the hood 30, particularly, in the passage 50. As illustrated in FIG. 6, according to an embodiment of the present disclosure, the filter 70 may have a ring shape. The ring-shaped filter 70 may be disposed in the entire opening of the passage 50. Accordingly, the filter 70 may filter foreign substances present in the travel wind W flowing into the passage 50 and protect the sensing portion 110. As a non-limiting example, the filter 70 may be a mesh filter. As another non-limiting example, the filter 70 may be a woven fiber filter. Although the drawing shows the hood and the filter each having a circular ring shape, the shape of the sensor protection system is not limited thereto and may differ depending on the shape of the sensing portion of the environmental sensor.

The filter 70 may be disposed in at least one of the entry passage 150 and the exit passage 250. The filter 70 may be disposed in both the entry passage 150 and the exit passage 250. To this end, the filter 70 may include a first filter 170 and a second filter 270.

Figure 7A:
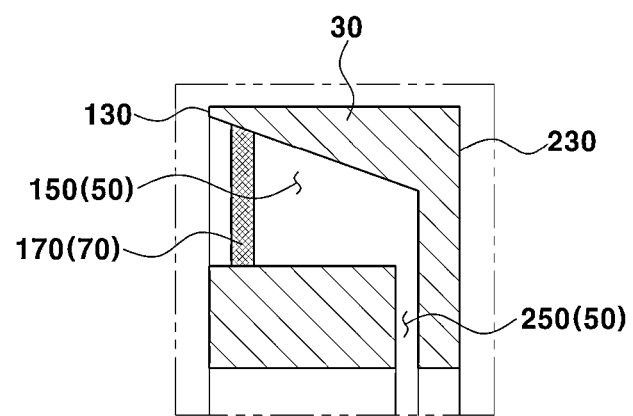
FIG. 7A is a partial cross-sectional view of a sensor protection system according to an embodiment of the present disclosure, illustrating mounting of a first filter.
Figure 7B:
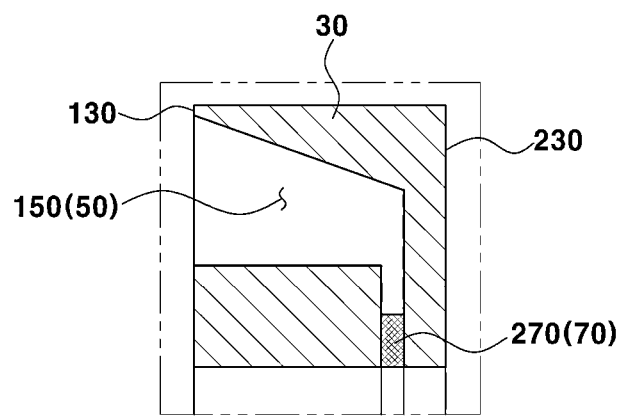
FIG. 7B is a partial cross-sectional view of a sensor protection system according to an embodiment of the present disclosure, illustrating mounting of a second filter.

As illustrated in FIG. 7A, the first filter 170 may be disposed in the entry passage 150 to primarily clean or remove foreign substances from the travel wind W introduced into the entry passage 150. In one embodiment, the first filter 170 may extend over the entire circumference of the hood 30. As illustrated in FIG. 7B, the second filter 270 may be disposed in the exit passage 250 to filter the travel wind W before the travel wind W is discharged to or toward the sensing portion 110.

Figure 8:
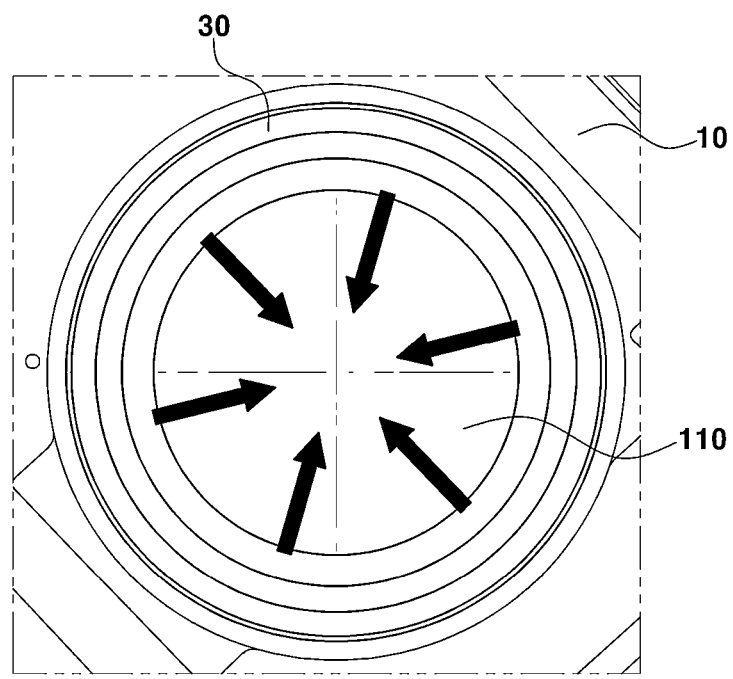
FIG. 8 illustrates a direction of an air curtain on a sensing portion of an environmental sensor, generated by a sensor protection system according to an embodiment of the present disclosure.

The operation of the sensor protection system according to the present disclosure is as follows. As the cross-sectional area of the passage 50 gradually decreases from the entry passage 150 to the exit passage 250, the speed of the travel wind W flowing through the passage 50 gradually increases. The travel wind W with an increased speed is discharged onto the sensing portion 110 through the exit passage 250, thereby forming an air curtain on the sensing portion 110 as illustrated in FIG. 8. Here, the filter 70 provided in the hood 30 filters foreign substances included in the travel wind W so that clean air may be provided onto the sensing portion 110 and damage to the sensing portion 110 caused by foreign substances may be prevented.

According to some embodiments of the present disclosure, the sensor protection system may be integrated with the environmental sensor 10. Although the hood 30 having the passage 50 formed therein has been described as a separate component mounted on the environmental sensor 10, the hood 30 may be integrated or integrally formed with the environmental sensor 10.

The sensor protection system according to the present disclosure may form an air curtain as a protective barrier on or over the sensing portion 110 of the environmental sensor 10. Specifically, because the travel wind W is utilized without a separate driver (e.g., compressor, fan) or electric power, the environmental sensor 10 may be economically and effectively protected.

In addition, according to the present disclosure, when the travel wind W passing through the passage 50 in the hood 30 is traveling fast enough, an air cleaning function for cleaning the sensing portion 110 may be provided together with the function of the air curtain.

The sensor protection system according to the present disclosure can minimize operation of the sensor cleaning system of the vehicle V, thereby reducing power consumption and the use of cleaning fluid.

In addition, the sensor protection system according to the present disclosure is capable of preventing frequent operation of the sensor cleaning system, such as the air-cleaning system 1 of the vehicle V, which can improve the durability of the sensor cleaning system.

As should be apparent from the above description, the present disclosure provides the following effects.

According to the present disclosure, provided is a sensor protection system using a travel wind to keep an environmental sensor clean while minimizing operation of a sensor cleaning system of a vehicle.

Effects of the present disclosure are not limited to those described above, and other effects not mentioned should be clearly recognized by those skilled in the art based on the above description.

It should be apparent to those of ordinary skill in the art to which the present disclosure pertains that the present inventive concept described above is not limited by the above-described embodiments and the accompanying drawings, and that various substitutions, modifications and changes are possible within a range that does not depart from the technical idea of the present disclosure.

What is claimed is:

1. A sensor protection system comprising:
an environmental sensor having a sensing portion; and
a hood on an environmental sensor, the hood including a passage configured to adjust an airflow incident on the sensing portion of the environmental sensor,
wherein the passage extends along an entire circumference of the sensing portion and is configured to direct the airflow toward the sensing portion along the entire circumference of the sensing portion,
wherein the passage comprises an entry passage formed on a distal end of the hood and extending in an axial direction of the hood and an exit passage extending from the entry passage in a radial direction of the hood,
wherein each of the entry passage and the exit passage is provided with a filter having a ring shape, and
wherein the airflow is air moving relative to a vehicle as the vehicle travels, and the sensing portion is positioned to face the airflow.

2. The sensor protection system according to claim 1, wherein the hood is provided on a circumference of the sensing portion.

3. The sensor protection system according to claim 2, wherein the hood is thread-coupled to the circumference of the sensing portion.

4. The sensor protection system according to claim 1, wherein the entry passage has a cross-sectional area decreasing towards the exit passage.

5. The sensor protection system according to claim 1, wherein the exit passage has a cross-sectional area smaller than the cross-sectional area of the entry passage.

6. The sensor protection system according to claim 1, wherein the filter comprises a first filter disposed in the entry passage.

7. The sensor protection system according to claim 1, wherein the filter comprises a second filter disposed in the exit passage.

8. The sensor protection system according to claim 1, wherein the hood is formed integrally with the environmental sensor.

9. The sensor protection system according to claim 1, wherein the environmental sensor is mounted on a vehicle to sense a surrounding environment of the vehicle.

10. The sensor protection system according to claim 1, wherein the air passing through the entry passage is guided to the exit passage extending from the entry passage, and the air passing through the exit passage is discharged onto the sensing portion.

11. The sensor protection system according to claim 1, wherein the hood is separate from the environmental sensor.

* * * * *